July 8, 1924.

R. E. STARNES

NIPPER CAM FOR WHITIN COMBERS

Filed July 20, 1923

Inventor
Rufus E. Starnes

By Lester L. Sargent
Attorney

Patented July 8, 1924.

1,500,281

UNITED STATES PATENT OFFICE.

RUFUS EDWARD STARNES, OF MOUNT HOLLY, NORTH CAROLINA.

NIPPER CAM FOR WHITIN COMBERS.

Application filed July 20, 1923. Serial No. 652,846.

*To all whom it may concern:*

Be it known that I, RUFUS EDWARD STARNES, a citizen of the United States, and a resident of Mount Holly, in the county of Gaston and State of North Carolina, have invented a new and useful Nipper Cam for Whitin Combers, of which the following is a specification.

The object of my invention is to provide a device which can be repaired more readily and without the expense heretofore involved in replacing cams on combing machines after the cams have become worn. I attain the objects of my invention by the mechanism illustrated in the accompany drawings, in which.

Like numerals indicate like parts in each of the several views.

Figure 1:
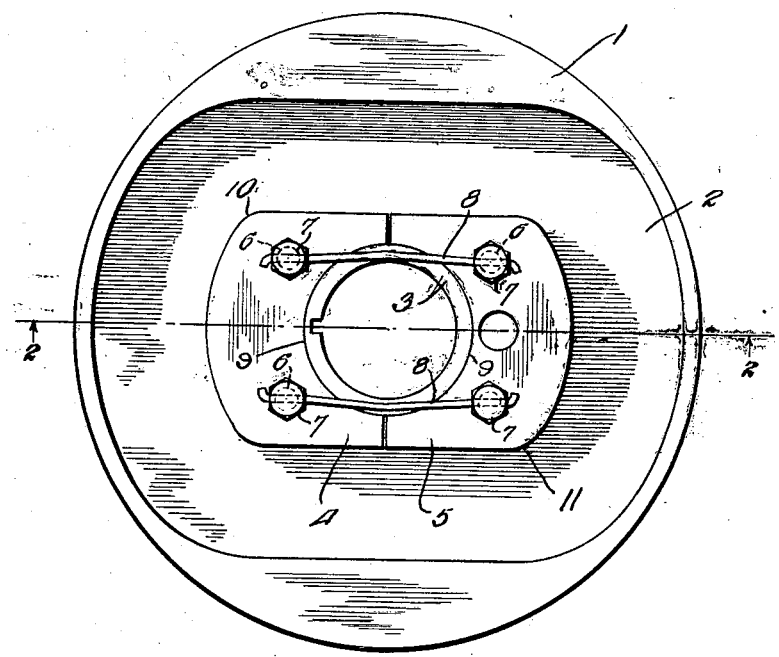
Figure 1 is a plan view.
Figure 2:
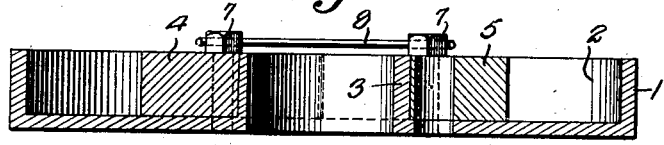
Figure 2 is a section on line 2—2 of Fig. 1.
Figure 3:
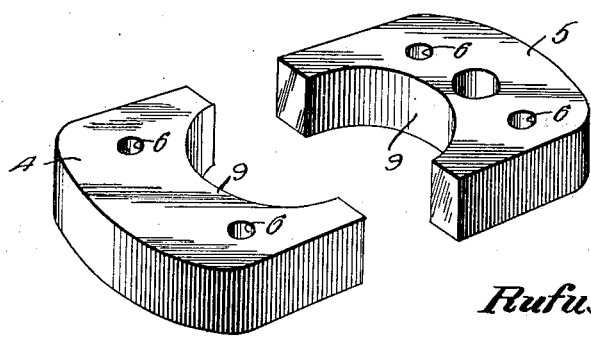
Fig. 3 is a perspective view of members 4 and 5 removed.

Referring to the accompanying drawings, I provide a cam 1 having cam-ways 2 and having inner like cam members 4 and 5. Members 4 and 5 have the semi-circular recessed portion 9 to engage around the bearing 3. Members 4 and 5 are also provided with recesses 6 to receive the bolts 7 by means of which the members 4 and 5 are fastened on to standard cam 1. I provide wires 8 which are removably inserted through the nuts on the bolts 7 of the respective cam members 4 and 5, as shown in Figs. 1 and 2 to lock the nuts of the bolts in place. In use the cam members 4 and 5 tend to wear at the portions 10 and 11, indicated on Fig. 1. With the cams heretofore in use it has been necessary to frequently take the entire cam out and put in a new one on account of the wear at these two portions. This operation of replacing the old standard cam with a new one has involved an expense of about $7.50 for the cam and about five hours time on the part of the mechanic, involving a total expense of $12.50, besides the loss of production of the entire combing machine for five hours or more. With the improvement disclosed in the accompanying drawings, it is possible to remove cam members 4 and 5 and simply reverse their positions on the bearing 9 at a loss of time of only about 20 minutes. The cost of new cam members of this type is but very little.

A very substantial saving of time and expense is thus effected by the substitution of the cam for the type of cam heretofore in use in machines of this class.

What I claim is:

1. In a device of the class described, the combination of a cam member having a cam race, a central bearing, opposite cam members removably and reversibly mountable on the bearing member, and forming the inner wall of the cam race and means for releasably locking said cam members in position on the cam to complete the cam race.

2. In a nipper cam for Whitin combers, the combination of a cam member recessed to form a cam race and having a central annular bearing, opposite like cam members removably and reversibly mounted on the central bearing, said cam members each having a plurality of openings therethrough, bolts extending through said openings and securing the removable cam members to the first-named cam member, and wires removably inserted through the nuts on the bolts of the respective cam members to lock the nuts in place, said wires having their ends bent to prevent working loose, substantially as shown.

RUFUS EDWARD STARNES.